Sept. 27, 1960 J. A. PASCUCCI ET AL 2,954,201

ADJUSTABLE MOUNTING DEVICE

Filed July 29, 1957 3 Sheets-Sheet 1

INVENTORS
JULIO A. PASCUCCI
ERNEST PASCUCCI
BY [signature]
ATTORNEY

Sept. 27, 1960 J. A. PASCUCCI ET AL 2,954,201

ADJUSTABLE MOUNTING DEVICE

Filed July 29, 1957 3 Sheets-Sheet 2

INVENTORS
JULIO A. PASCUCCI
ERNEST PASCUCCI
BY [signature]
ATTORNEY

ADJUSTABLE MOUNTING DEVICE

Filed July 29, 1957

INVENTORS
JULIO A. PASCUCCI
ERNEST PASCUCCI
BY
ATTORNEY

United States Patent Office 2,954,201

Patented Sept. 27, 1960

2,954,201

ADJUSTABLE MOUNTING DEVICE

Julio A. Pascucci and Ernest B. Pascucci, Meriden, Conn., assignors to The Miller Company, Meriden, Conn., a corporation of Connecticut Filed July 29, 1957, Ser. No. 674,867

14 Claims. (Cl. 248—343)

This invention relates to an adjustable mounting device and more specifically to an improved adjustable mount useful, among other things, for supporting fluorescent and other types of lighting fixtures within a ceiling opening.

A number of devices have been proposed for supporting fluorescent and other lighting fixtures within a ceiling opening but these proposed devices have not been found entirely satisfactory. In cases where recessed lighting is to be installed in the ceiling a so-called false ceiling is usually provided which is supported by sets of channel members disposed generally at right angles one to the other. The members are spaced to accommodate the fixtures to be mounted in the ceiling and the fixtures are actually supported by means of yokes or other devices spanning the channel members and attached to the fixtures. In the use of yokes it is, of course, necessary to install the yokes in position bridging the fixture receiving opening and in accurate longitudinal alignment so that the fastening means customarily carried by the yokes will automatically align with openings in the fixture when the latter is inserted in the ceiling. In addition it is desirable to cover the fixture supporting means so that it is necessary in most cases to materially dismantle the fixture before installation and then assemble it after the basic structure of the fixture is secured in place. As a result the installation of fixtures in this manner is not only difficult and time consuming but adjustment of the fixture to level its peripheral edge with the ceiling is difficult to achieve.

This invention overcomes the disadvantages of prior mounting devices and provides an improved mount that greatly facilitates the installation of fluorescent fixtures and other fixtures and at the same time affords a relatively low cost dependable fixture mount that does not require any dismantling of the fixture for the purpose of installation.

Another object of the invention resides in the provision of a novel and improved mount for fluorescent and other fixtures that may be releasably attached to the fixture and afford a dependable support therefor.

Another object of the invention resides in the provision of a novel and improved support for fluorescent fixtures particularly useful for supporting fixtures within a ceiling opening whereby the supports may be moved out of line with the periphery of the fixture to permit insertion of the fixtures within the opening and then displaced outwardly to engage fixture supporting members along the edges of the opening. For removal of the fixture the members may be quickly and easily retracted to the out-of-line position.

A still further object of the invention resides in an adjustable mount for fluorescent fixtures that may be pivotally secured to the fixture for displacement out of line with the fixture to facilitate its insertion within a ceiling opening and then moved outwardly to engage the fixture supports and adjusted to level the fixture with the ceiling.

A still further object of the invention resides in the novel and improved fixture support that may be detachably secured to the fixture for pivotal movement relative thereto and which is characterized by its simplicity of manufacture, assembly and adjustment.

A still further object of the invention resides in the provision of a novel and improved fixture support, for securing fluorescent and other fixtures within a ceiling opening and that may be quickly and easily released for removal of the fixture.

The above and other objects and advantages of the invention will become more apparent from the following description and accompanying drawings forming part of this application.

As pointed out above the novel and improved mount in accordance with the invention is particularly useful for the support of lighting fixtures of both the fluorescent and incandescent types. For the purposes of this application the mount has been illustrated and will be described in connection with the support of a fluorescent fixture within a ceiling opening having an area and configuration that will receive the fixture so that the fixture upon installation will completely close the opening.

Figure 1:
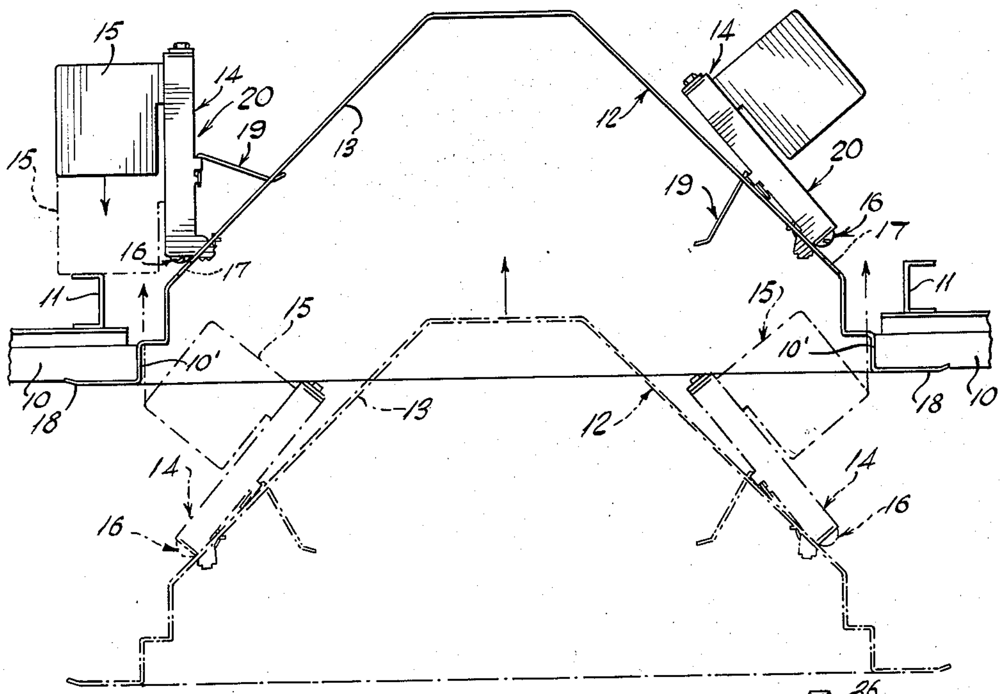
Fig. 1 is a cross sectional view of the outer shell of a fluorescent fixture with mounting devices in accordance with one embodiment of the invention secured thereto for holding the fixture within the ceiling opening, the fixture and mounts being shown in dotted lines for insertion into the ceiling and in full line position within a ceiling opening.

Referring now to Fig. 1 there is illustrated a ceiling 10 that may be supported by spaced channel members 11 in the usual manner and having an opening between the channel members for the reception of an elongated fluorescent fixture generally denoted by the numeral 12. For convenience the fluorescent fixture has merely been illustrated by an outer channel-like casing member 13 and the lamps, reflectors, wiring channels and other elements have been omitted for simplification. In this embodiment of the invention, the side walls of the fixture frame 13 each carry a pair of mounting devices in accordance with the invention. These devices or mounts are generally denoted by the numeral 14 and in this figure one mount of each pair is illustrated, it being understood that in certain applications one or more of the mounting devices 14 may be employed in combination with other supporting means. To illustrate the operation of each mounting device 14 for installation of the fluorescent fixture 12, the fixture is shown in dotted outline below the ceiling 10 with the mounts 14 being retracted to a position out of line with the edges 10' of the ceiling 10. With the mounts in this position the fixture may be inserted within the ceiling opening whereupon the mounts are moved outwardly as shown at the left. When the mounts are extended the arms 15 may be moved downwardly by the operation of screws 16 accessible through openings 17 in the frame 13 of the fixture 12. The lowered position of arm 15 of the left mount is shown in dotted outline in Fig. 1. In normal operation the arm 15 is lowered until it contacts the supporting channel 11 and urges the peripheral flange 18 of the fixture snugly up against the ceiling 10. By individually adjusting each mounting device 14, the peripheral flange 18 of the fixture can be levelled with the ceiling and the problems entailed with former devices such as yokes and the like are completely overcome.

To remove the fixture after installation as described in connection with Fig. 1 it merely necessary to release the pressure of the arms 15 on the channels 11 and then move the mounts 14 to the retracted position by disengaging the locking springs 19 from engagement with the reflector 13 as will be described. With the mounts 14 in the retracted position the fixture may be lowered from the opening for replacement or repair.

Reference is now made to Figs. 2–7 which illustrate the construction and operation of the mount 14 as illustrated in Fig. 1. By reason of a novel and improved arrangement and construction, the elements forming the mount may be simply and easily fabricated and assembled without the need of special fasteners or tools of any type.

Figures 2, 3, 4, 5, 9, 10:
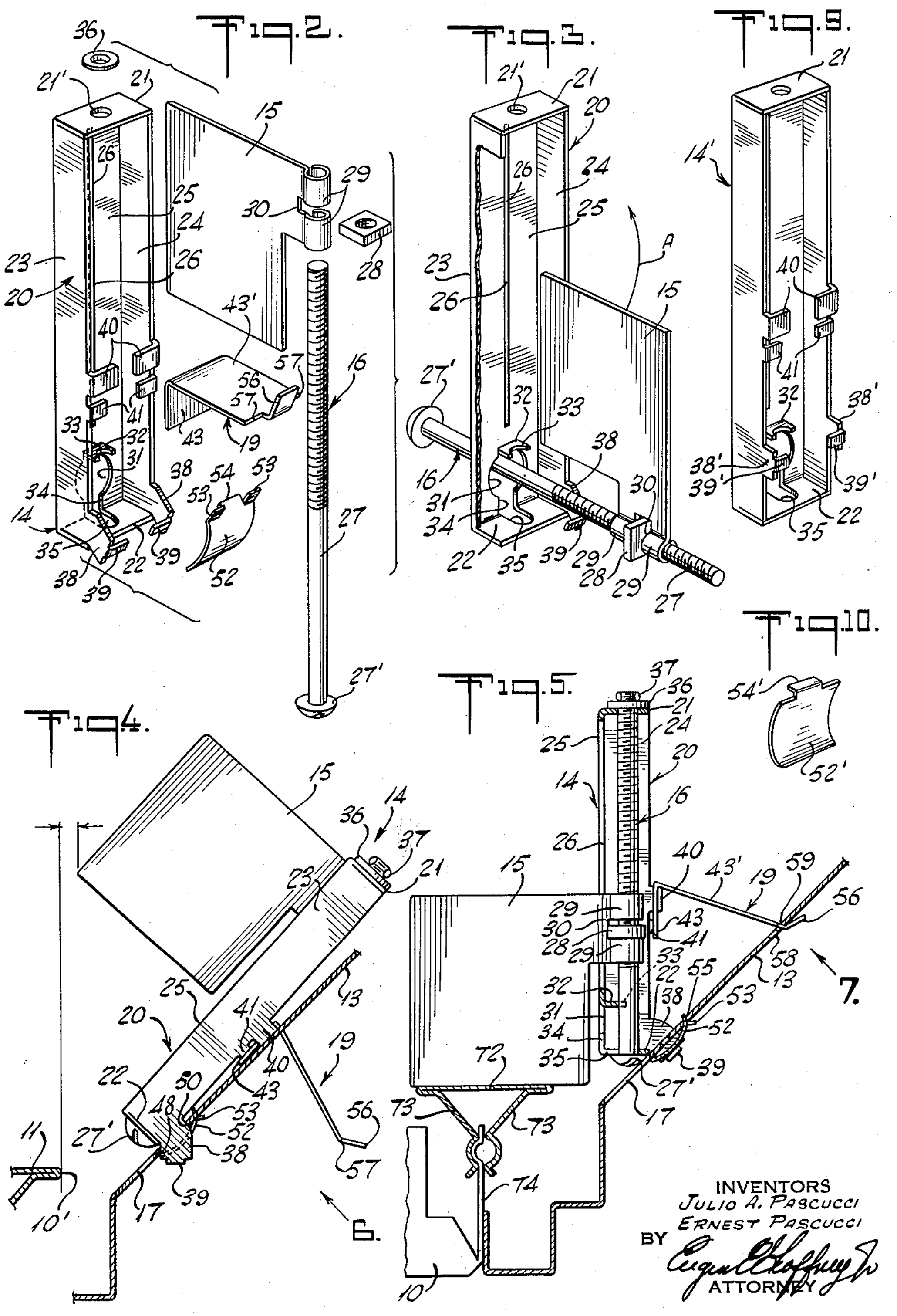
Fig. 2 is an exploded view in perspective of a mount in accordance with the embodiment of the invention shown in Fig. 1.
Fig. 3 is a partially assembled perspective view of the mount shown in Fig. 2.
Fig. 4 is a side elevational view of the mount illustrated in Figs. 2 and 3 in position on a fluorescent fixture and in the retracted position for installation of the fixture.
Fig. 5 is a view similar to Fig. 4 with the mount in the extended position and adjusted to support the fixture.
Fig. 9 is a perspective view of the body or frame of a modified mount.
Fig. 10 is a perspective view of a clip for securing the mount of Figs. 9 and 11 to the body of a fluorescent fixture.

More specifically and with reference to Figs. 2 and 3 the mount 14 includes an elongated box-like frame member generally denoted by the numeral 20 having top and bottom members 21 and 22, side walls 23 and 24 and a front wall 25. The front wall is provided with an elongated slot 26 for slidably receiving the arm 15, the latter being carried by a vertically disposed screw 27 and adjustably positioned by the cooperation of a nut 28 carried between a pair of collars 29 formed integrally with the arm 15. The size of the nut 28 is coordinated with the slot 30 disposed between the collars 29 so that the nut cannot rotate relative to the arm in response to rotation of the screw 27. The bottom portion of the front wall 25 includes an opening 31 having a diameter slightly larger than the head 27' of the screw 27. At the upper end of the opening 31 there is disposed an inwardly extending bearing tab 32 having a semicircular recess 33 for the reception of the screw 27 when in position within the housing 20. The bottom end of the opening 31 communicates with an elongated slot 34 terminating at the bottom edge of the front wall 25 and aligned with a U-shaped slot 35 in the bottom wall 32. With this arrangement and with the arm 15 and nut 28 assembled in the screw 27, as shown in Fig. 3, the head 27' of the screw 27 is inserted through the opening 31 whereupon the arm is tilted upwardly as indicated by the arrow A in Fig. 3 and engaged with the slot 26. When the screw is in the vertical position the head 27' of the screw will bear against the bottom wall 22 as shown in Fig. 5 of the drawings and the upper end of the screw will extend through an opening 21' in the top wall 21. To secure the screw 27 in place a washer 36 is preferably placed over the end of the screw and then the screw end is deformed or pinched as indicated at 37 to prevent its retraction. With this arrangement the screw 27 cannot be withdrawn and the bottom end of the screw is held in place by the cooperation of the tab 32 and the slot 35.

To facilitate the attachment of the mount this far described to the body of a fixture to be supported the lower end of the housing or frame member 20 is provided with a pair of outwardly extending tab portions 38 inclined slightly downwardly and preferably formed integrally with the side walls 23 and 24. These tabs 38 terminate in smaller tab sections 39 that are bent inwardly and are of slightly reduced section.

In addition to the tabs 38 the frame is provided with two additional pairs of tabs 40 and 41. The tabs 41 are spaced from the bottom of the housing 20 and extend inwardly one toward the other. The upper set of tabs 40 are somewhat longer than the tabs 41 and are spaced outwardly from the tabs 41. These tabs are adapted to receive L-shaped locking member 19 by engagement of the downwardly extending leg 43 as shown more clearly in Fig. 5. This locking member 19 operates to hold the mount 14 in the extended position for support of the fixture and permits retraction of the mount for installation and removal of the fixture.

Attachment of the mount 14 to the wall 13 of the fixture 12 is accomplished by engagement of the tabs 38, 39 with an opening in the wall 13 that is generally denoted by the numeral 44. This opening has what may be generally termined an M configuration and will accommodate several types of mounts such as those shown in Figs. 2, 11, 12 and 13. More specifically, the upper edge of the opening 44 has an inwardly formed V-shaped portion 45 and the lower edge includes a V-shaped tab-like portion 46, the portions 45 and 46 defining a relatively narrow, V-shaped channel 47 terminating at each end in large open portions 48, 49. The outer edges of the opening 44 include narrow, upwardly extending slotted parts 50 and 51.

In the insertion of the tabs 38 through the opening 44, the tabs will slidably engage the edges of the opening 44 and the slotted parts 50 and 51. The inwardly formed tab portions 39 are adjusted in length so that they will clear the central V-shaped tab 46. When the tabs 38 and 39 are extended through the opening a small arcuate spring 52 is inserted between the wall 13 and the tabs 39. The spring 52 includes a pair of outer tabs 53 and a central tab 54 that is off-set from the tabs 53. A tab 54 engages a narrow opening 55 in the wall 13 to hold the spring 52 in place. With this arrangement it will be observed that the mount 14 can be rotated from a position in proximity to the wall 13 as shown in Fig. 1 to a position extending outwardly from the wall 13 to engage a supporting channel 11, as previously described.

Figure 15:
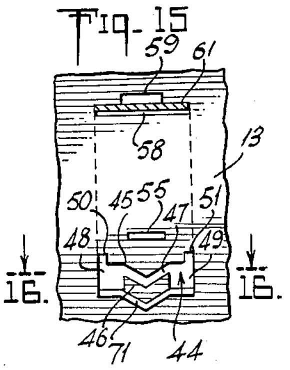
Fig. 15 is a cross sectional view of Fig. 14 taken along the line 15—15 thereof.
Figure 16:
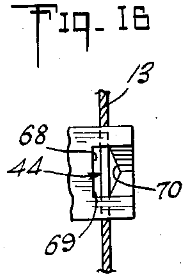
Fig. 16 is a cross sectional view of Fig. 15 taken along the line 16—16 thereof.

The mount is held in the outermost position, as shown to the left of Fig. 1 by the spring clip or latch 19. The horizontal leg 43' of this latch includes an upwardly formed tab 56 which cooperates with the shoulders 57 of the leg 43' to hold the mount in the outermost position. More specifically, the latch 19 engages an upper opening 58 in the fixture wall 13, as shown more clearly in Fig. 15. The latch 19 is arranged so that upon engagement by the tabs 40 and 41 the leg 43' will be biased against the upper edge of the opening 58. When the latch is pushed inwardly to extend the mount 15 to the vertical position shown in Fig. 1, the neck of the table 56 will snap upwardly into the portion 59 of opening 58 and shoulders 57 will bear against the portions of wall 13 adjoining the opening part 59. To release the mount 14 from its vertical position, the latch 19 need only be pressed downwardly by insertion of a screw driver or similar tool between the tab 58 and wall 13, whereupon the mount can then be withdrawn to the inclined position shown to the right of Fig. 1, and the fixture removed from the opening. This withdrawn position is also shown in Fig. 4 of the drawings.

Figure 11:
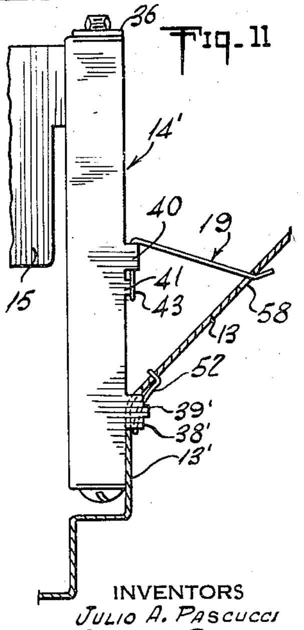
Fig. 11 is a side elevational view of the modified mount in position on a fixture.
Figure 7:
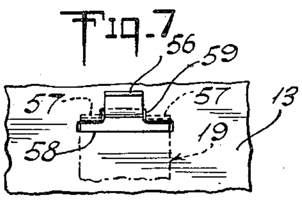
Fig. 7 is a fragmentary view of Fig. 5 taken in the direction of the arrow 7 thereof.

A slightly modified embodiment of the invention is shown in Fig. 11. This embodiment is substantially identical to that shown in Figs. 1 to 7 with the exception that the revised mount 14, denoted by the numeral 14′ is hingeably connected to the wall 13 of the fixture at the joinder of the wall 13 with a vertical wall portion 13′. In this embodiment the hingeable connection is in the form of straight, L-shaped tabs having leg sections 38′ and 39′, respectively, with the leg 39′ disposed at right angles to the leg 38′ and of somewhat narrower width than the tab 38′. The other portions of the mount and method of its operation are substantially identical to the embodiment shown in Figs. 1 through 7.

Figure 8:
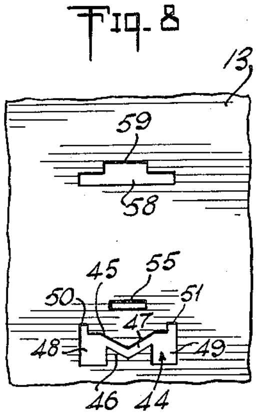
Fig. 8 is a fragmentary view of one side of a fluorescent fixture illustrating the openings therein for the attachment of the mount shown in Figs. 1–7.
Figure 6:
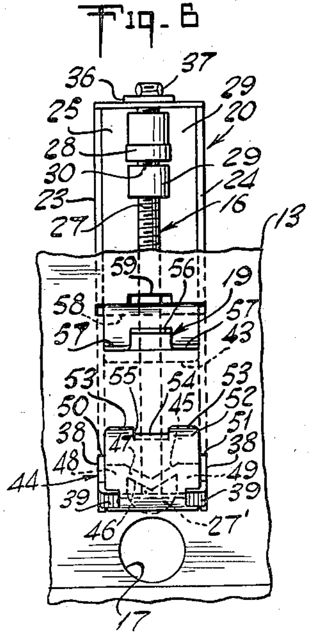
Fig. 6 is a view taken in the direction of the arrow 6 of Fig. 4.

A still further embodiment of the invention is shown in Figs. 12 and 14 to 16, inclusive, and concerns a hingeable mount wherein the adjustment is accomplished by means of the resilience of the mount itself. This mount is adapted to engage the openings 44 and 58 of Fig. 8 and, as will be shown, explains the reason for the configuration of the opening 44. More specifically, the mount is fabricated of a resilient material and is generally denoted by the numeral 60. It includes an arcuate section 61 encompassing an angle somewhat greater than 90° and terminates at its upper end in a narrow tab 62 having a neck-like portion 63. The lower end of the arcuate section 61 is bent inwardly to form a flat portion 64 generally perpendicular to the tangent of the arcuate section 61 at the point of attachment. The inner end of the section 64 is provided with an inclined portion 65, a narrow, neck-like portion 66 substantially parallel with the portion 64 and an upwardly extending tab 67. The tab 67 and the narrow section 66 are provided with an opening 68 having a rectangular bottom portion 69, as may be observed in Fig. 16, and a V-shaped upper wall 70. The narrow bridging portion 71 remaining after forming the opening 68 is bent outwardly as in Fig. 12 to present a V-shaped configuration when viewed from the end. The sections 64 and 65 comprise in effect a hingeable arm that is movable toward and away from the fixture and corresponds to the arm 15 of mount 14.

Figure 14:
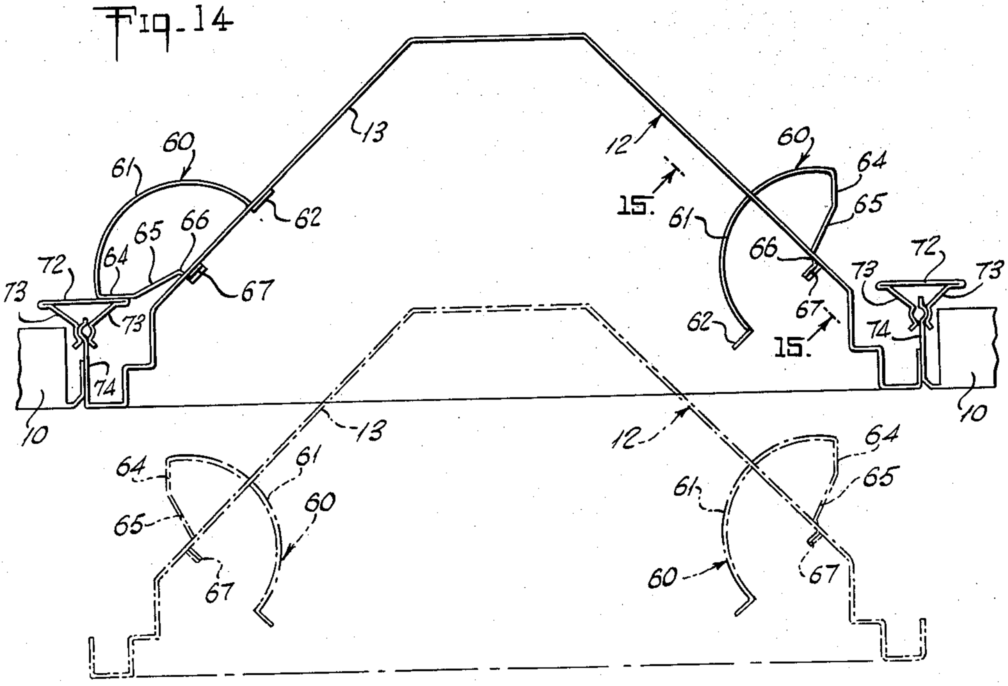
Fig. 14 is an end view of a fluorescent fixture showing the installation and operation of the mount as shown in Fig. 12.

To install the mount 60 on the wall 13 of a fixture, the V-shaped tab 67 is inserted through the opening 44 so that the bridging member 71 passes through the V-shaped portion 47 of opening 44 and engages the V-shaped tab 46. With the arcuate section 61 in engagement with the upper opening 58, the mount can be moved to the retracted position, as shown in dotted outline at the bottom of Fig. 14. With the mount in this retracted position, the fixture may be inserted into the ceiling opening, as shown in full line position in Fig. 14, whereupon each mount 60 may be moved to the extended position for engagement with the supporting T-bar brackets 72. If the fixture is to be removed, it is merely necessary to insert a screw driver or other tool between the tab 62 and the wall 13 to release the mount from its locked position and permit its retraction, as shown at the left of Fig. 14.

In the foregoing embodiment of the invention a somewhat modified fluorescent fixture is illustrated utilizing the T-bars 72 with spring arms 73 for engaging a cooperating element 74 formed as part of the fixture. While the T-bar 72 and the cooperating fixture portion 74 furnish support for the fixture, the mount 60 prevents disengagement of the fixture 12 from the T-bars 72. The mount 60 may of course form the sole support for the fixture.

It will be observed from the configuration of the mount 60 and particularly the arcuate section 61, that the latter can compenstae for slight differences or variations in the position of the T-bar 72 and the positions of the openings 44 and 58 on the fixture when the mounts furnish the sole support for the fixture and the latter includes ceiling engaging elements for aligning the fixture with the ceiling.

Figure 12:
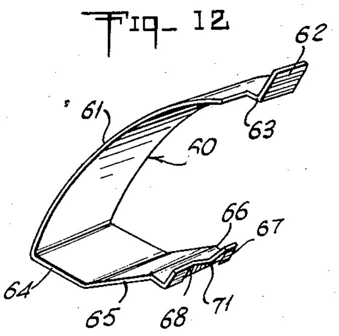
Figs. 12 and 13 are perspective views of still further modifications of the invention.
Figure 13:
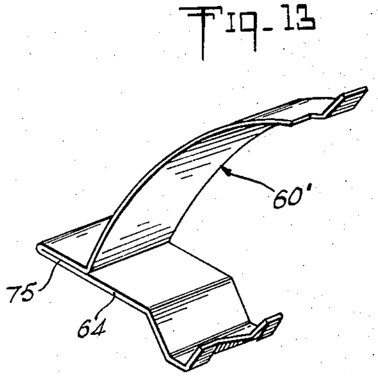
Figure 17:
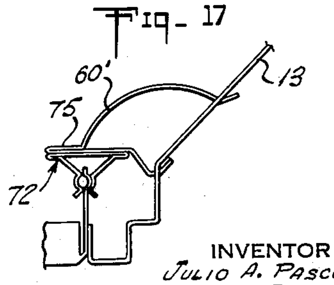
Fig. 17 is a fragmentary end view of a fluorescent fixture illustrating the cooperation of the mount of Fig. 13 with a fixture for the support thereof.

The embodiment of the invention shown in Fig. 13 is substantially identical to that shown in Fig. 12, except that the mount 60′ of Fig. 13 includes an outwardly extending portion 75 in a plane with the mount part 64, so that a broader area of contact will be made with the T-bar 72, as will be observed more clearly in Fig. 17. In the case of the mount 60′ of Fig. 13, it is evident that it may be formed of a single strip of material or may be fabricated of two or more individual portions, as may be desired.

The foregoing embodiments of the invention have been illustrated in connection with an elongated fixture and pairs of mounts were shown at each end of the fixture. It is apparent, however, that in place of the utilization of four mounts 14, 14′, 60 and 60′, that one or more of such mounts may be used along with fixed mounts for the support of a single fixture. In addition, the mounts 60 and 60′ may be used, in combination with the channels 11 and similarly, the mounts 14 and 14′ are equally adaptable for use with the T-bars 72.

While only certain embodiments of the invention have been described, it is apparent that modifications, alterations and changes may be made without departing from the true scope and spirit of the present invention as defined by the appended claims.

What is claimed is:

1. A mount for supporting lighting fixtures comprising a frame member including fixture support engaging means movable relative to said frame and means for pivotally attaching said frame member to said fixture for movement in one direction about said pivot toward said fixture and in another direction about said pivot outwardly of said fixture for engagement of the fixture support.

2. The combination according to claim 1 wherein said engaging means is movable linearly relative to said frame member and said frame member is movable toward and away from said fixture support.

3. The combination with a lighting fixture of a mount comprising an elongated body member, an elongated threaded rod within and supported by said body, an arm extending outwardly from and supported by said rod, means threadably engaging said rod with said arm and means pivotally securing said mount to a fixture adapted to be supported at least in part by said mount, said mount being movable about said pivot to move said arm into and out of fixture supporting position.

4. A fixture mount comprising an elongated frame, a screw threaded rod rotatably carried by said frame, an arm engaging said threaded rod and extending outwardly from said frame, said arm being movable lengthwise of the frame by rotation of the rod, at least two sets of mounting tabs carried by said frame, means engaging one set of tabs for hingeably securing said mount to a fixture to be supported thereby, and means engaging the other set of tabs for adjustably positioning said frame relative to the fixture.

5. A fixture mount comprising an elongated frame, a screw threaded rod rotatably carried by said frame, an arm engaging said threaded rod and extending outwardly from said frame, said arm being movable lengthwise of the frame by rotation of the rod, at least two sets of mounting tabs carried by said frame, means engaging one set of tabs for hingeably securing said mount to a fixture to be supported thereby, means engaging the other set of tabs for adjustably positioning said frame relative to the fixture, wherein said frame including side, front and end walls with said tabs being carried by said side walls, said front wall includes an elongated slot for slidably guiding said arm, said end walls include screw engaging openings and said front wall carries a bearing tab rotatably engaging said rod.

6. A fixture mount according to claim 5 wherein said rod is provided with an enlarged portion on one end thereof, said front wall includes an enlarged opening between said bearing forming tab and one end wall and the opening in said one end wall is elongated and communicates with the front wall opening to form an L-shaped opening whereby insertion of the head of the rod through the front wall opening and displacement of the rod to engage the bearing tab and the opening in the other end wall will hold the rod in place in the frame.

7. The combination with a fixture having at least two spaced openings therein, of a support for said fixture comprising an elongated frame, a threaded rod carried by said frame, an arm extending from said frame and threadably engaging the rod for movement longitudinally of the frame by rotation of the rod, means carried by said frame for engaging one of said spaced openings for hingeably securing said frame to the fixture, and frame positioning means carried by the frame and engaging the other of said spaced openings.

8. The combination with a fixture having at least two spaced openings therein, of a support for said fixture comprising an elongated frame, a threaded rod carried by said frame, an arm extending from said frame and threadably engaging the rod for movement longitudinally of the frame by rotation of the rod, means carried by said frame for engaging one of said spaced openings for hingeably securing said frame to the fixture, frame positioning means carried by the frame and engaging the other of said spaced openings, wherein said hingeable securing means includes a pair of L-shaped tabs extending through said one fixture opening and means releasably engaging said tabs for holding them in engagement with the opening.

9. The combination with a fixture having at least two spaced openings therein, of a support for said fixture comprising an elongated frame, a threaded rod carried by said frame, an arm extending from said frame and threadably engaging the rod for movement longitudinally of the frame by rotation of the rod, means carried by said frame for engaging one of said spaced openings for hingeably securing said frame to the fixture, frame positioning means carried by the frame and engaging the other of said spaced openings, wherein said frame positioning means comprises spaced tabs carried by said frame, an L-shaped spring member having one leg in engagement with said tabs and the other leg in engagement with the other of said fixture openings and cooperating means on said other opening and the last said leg for holding the latter in a predetermined position relative to said fixture whereby the mount may be moved toward and away from said fixture.

10. A mount for fixtures having a pair of spaced openings therein comprising an arm, means on one end of said arm for hingeably securing it to one of said openings, an arcuate member secured to and extending from said arm, said member slidably engaging the other of said openings to permit the arm to be moved toward and away from said fixture and cooperating means on said arcuate member and the other of said openings for holding the arm in position extending outwardly of said fixture for the support thereof.

11. A mount according to claim 10 wherein said one opening is of non-linear configuration and said securing means includes an opening spaced from the end of said arm with said end having a cross-sectional configuration corresponding to the configuration of said opening.

12. A mount according to claim 11 wherein said one opening and arm end have generally V-shaped configurations.

13. A mount according to claim 10 wherein said arcuate member is secured to the outer end of said arm.

14. A mount according to claim 10 wherein said arcuate member is secured to said arm at a point spaced from the outer end thereof.

References Cited in the file of this patent

UNITED STATES PATENTS

| | | |
|---|---|---|
| 1,735,024 | Toncray | Nov. 12, 1929 |
| 1,729,879 | Krantz | Oct. 1, 1929 |
| 1,807,527 | Hanny | May 26, 1931 |
| 2,299,696 | Gregersen | Oct. 20, 1942 |
| 2,320,400 | Bedell | June 1, 1943 |
| 2,340,823 | Scott | Feb. 4, 1944 |
| 2,559,241 | Bernstein | July 3, 1951 |
| 2,597,875 | Kruger | May 27, 1952 |
| 2,614,785 | Versen | Oct. 21, 1952 |
| 2,744,716 | Zingone | May 8, 1956 |